United States Patent Office 3,094,100
Patented June 18, 1963

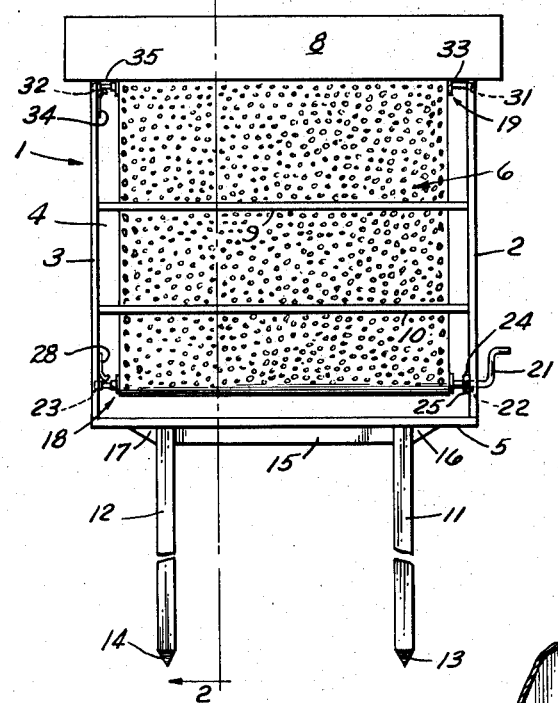

3,094,100
BIRD FEEDER
Glenn E. Wise, 2415 39th Place NW.,
Washington 7, D.C.
Filed Sept. 1, 1960, Ser. No. 53,493
8 Claims. (Cl. 119—51)

This invention relates to a feeding station for birds and, more particularly, to a bird feeder including a seed-carrying tape, which tape may be moved, after the birds have eaten all of the seeds off of one area thereof, so as to expose a new seed-carrying area of the tape to the birds for their additional feeding.

One object of the invention is to provide means for storing and presenting to birds for feeding purposes a considerable amount of edible material.

Another object of the invention is to provide novel feed-carrying means in a bird feeder which will minimize feed waste.

A still further object of the invention is to provide a bird feeder having a housing for partially protecting the feed supply from the elements and for partially protecting the birds from the elements while they are feeding.

Other objects will be apparent from the remainder of the specification and from the drawings.

In the drawings which form a part of this application:

FIGURE 1 is a front elevational view of the invention;

FIGURE 2 is a vertical sectional view taken on the line 2—2 of FIGURE 1, with a bird shown in feeding position on the feeder;

FIGURE 3 is a right side elevation of the structure of the invention;

FIGURE 4 is an enlarged partial three dimensional view showing a portion of the feeder housing, a portion of the lower seed tape-carrying roller means, and a brake means for preventing unwanted rotation of the lower roller means; and FIGURE 5 is an enlarged plan view of an end portion of one type of seed tape which I may employ in my invention.

Referring now to the drawings by reference numerals, my bird feeder includes a housing, designated generally by 1. Housing 1, more particularly, is composed of sides 2 and 3, a back 4, a bottom 5, and a gabled roof composed of roof elements 7 and 8. All of the elements of housing 1 are preferably made of wood, or the like, and these elements are fastened together at their meeting edges by means of nails or the like, not shown, in a conventional manner.

The housing 1, thus described, comprises a substantially box-like container open on its front side. Extending horizontally across said front side and attached at their opposite ends to sides 2 and 3 are upper and lower bird perches 9 and 10, respectively.

Depending from and fastened to the underside of the bottom 5 by means of nails, not shown, are spaced supporting legs 11 and 12. Legs 11 and 12 are pointed at their lower ends 13 and 14, respectively, so that they may be inserted into the ground to support the bird feeder. To insure that the legs will remain substantially perpendicular to the bottom 5, a center cleat 15, and two end cleats 16 and 17 are nailed or screwed to the bottom 5 and the legs 11 and 12 in the locations shown in FIGURES 1 to 3.

Within housing 1 are located a lower and an upper roller assembly. The lower roller assembly is designated generally by 18, and the upper roller assembly is designated generally by 19.

Roller assembly 18, more particularly, is composed of an elongated, round pivot rod 20, one end of which is bent to form a crank 21. The crank end of rod 20 passes through an aperture 22 in side 2 and is thus journalled for rotation relative to side 2. The opposite end of rod 20 engages in a shallow circular bore 23 formed in the lower inside portion of side 3, and is thus journalled for rotation relative to side 3. A conventional stop collar 24 surrounds and is fastened on rod 20 just inside side 2, as by means of set screw 25, and this collar prevents rod 20 from shifting along its longitudinal axis.

Affixed to rod 20 substantially centrally between sides 2 and 3, as by means of glue, or the like, is a round, wooden roller body 26, and driven part way into body 26 are a plurality of short, pointed pins 27 for a purpose to be described.

To prevent roller body 26 from rotating, except when the crank 21 is forcefully turned, I provide means for braking the pivot rod 20. This braking means as seen in FIGURE 1 includes an angular resilient, metal brake plate 28 which is fastened by screws to the lower inside portion of side 3 in such manner that its lower free end normally bears against one flat face of a squared-off portion 29 formed on rod 20. With such a construction rod 20 cannot be rotated unless sufficient force is applied to crank 21 to cause the corners of portion 29 to spring the lower end of plate 28 upwardly slightly, as is the case illustrated in FIGURE 4 where the lower end of plate 28 is shown sprung slightly upward by a corner of portion 29.

Roller assembly 19, more particularly, is composed of an elongated, round pivot rod 30, the opposite ends of which are seated in shallow circular bores 31 and 32 located in the upper inside portions of sides 2 and 3, respectively. Bores 31 and 32, seen in dotted lines in FIGURE 1, provide bearings in which rod 30 may be rotated relative to housing 1.

Affixed to rod 30 substantially centrally between sides 2 and 3, as by means of glue or the like, is a round, wooden roller body 33, and driven part way into body 33 are another plurality of short, pointed pins 27, identical with pins 27 in roller body 26, which are for a purpose to be described.

To prevent roller body 33 from rotating, except when a person desires it to rotate, means are provided for braking the rod 30. This braking means operates substantially identically to the braking means previously described, but to complete the description, this second braking means includes a resilient, metal angular brake plate 34 which is fastened by screws to the upper inside portion of side 3 in such manner that its upper free end bears against a squared-off portion 35 formed on rod 30. Thus, rod 30 cannot be rotated unless sufficient turning force is applied to rod 30 to cause the corners of portion 35 to spring the upper end of plate 34 downward slightly.

Roller assemblies 18 and 19 are provided to carry the opposite ends of an elongated seed-carrying member or "tape" designated generally at 6. Tape 6, more particularly, is composed of a loosely woven flexible fabric backing 36, such as burlap, or the like, and projectingly attached to one face of the fabric 36, by means of an appropriate adhesive 37 which, for instance, may be casein or gelatin glue, or flour and water paste, are a great many seeds 38. Seeds 38, it is to be noted from FIGURES 2 and 5, while being embedded in the adhesive, are not encased thereby, for it is important that the seeds be partially exposed so that feeding birds such as that shown at B, FIGURE 2, may have direct pecking access to the seeds 38. The seeds 38 may be useful, fertile seeds, or alternatively, they may be useless cull or weed seeds not ordinarily of any commercial value.

The seeds 38 and adhesive 37 may coat and cover the width of the tape, as shown in FIGURE 1, but, preferably, they are not applied to the very ends of the tape. Therefore, "free" or uncoated fabric ends (such as end 39, FIGURE 5) are provided so that the fabric at these ends may be easily impaled on pins 27 as to be described.

When flour and water paste is employed as the means for attaching the seeds 38 to the fabric backing 36 a second source of feed is provided since birds, I have discovered, will peck away and eat such paste as well as the seeds. Thus, the only non-edible portion of a tape constructed as just described is the backing 36.

Having now described the various elements of my invention, I will now set forth one mode of operation.

A person would first erect my feeder, less tape 6, by burying the lower ends of legs 11 and 12 in the ground. Next he would thread one uncoated end 39 of tape 6 over the top of perch 9 and thence over the top of roller body 33, while concurrently centering the tape, seed side out relative to the body 33. Next, this end 39 is pressed down over and thus impaled upon the pins 27 in roller body 33, and substantially all of tape 6 is then wound up on body 33 by rotating the body clockwise as seen in FIGURE 2. At this juncture the free end of tape 6 is drawn substantially vertically downward and is disposed under and up around the rear side of roller body 26. The lower free end 39 of the tape is now attached to roller body 26 by impaling it on the exposed ends of body 26's pins 27. Roller body 26 is now rotated counter-clockwise, as seen in FIGURE 2, by turning crank 21 in the direction of the arrow of FIGURE 3, until tape 6 is stretched taut between the upper and lower roller assemblies. With my invention in this condition, the person would depart and birds such as B, FIGURE 2, could come and perch to feed from the feeder.

When the birds, as a result of feeding, have denuded the exposed portion of tape 6 of seeds (or of seeds and adhesive if the adhesive is edible), turning of crank 21 counter-clockwise will unwind and expose a fresh seed-carrying portion of the tape to the birds, and the now denuded portion of the tape will be wound up on roller body 26. When all of the edible material has been pecked off a given tape 6, such tape may be removed from the feeder, and replaced with a fresh tape.

Rotation of the roller bodies 26 and 33, and thus sagging of the tape, under influence of the birds' pecking is prevented by the braking means previously described, since considerable force is required to rotate rods 20 and 30 against the pressure of the braking means.

It will be noted that edible material loosened from the tape by pecking, but not immediately eaten will drop down on the top of bottom 5 where it will rest until discovered later and eaten by the birds.

The tape 6 may be shipped from its point of manufacture to a consumer in either roller or folded form, as desired.

It is obvious that many changes might be made in the illustrated embodiment of my invention without departing from the spirit thereof. For example, the housing might be constructed along different lines and of other materials, or the braking means or tape might take different but equivalent forms.

Having now, however, disclosed one specific embodiment of my invention, what I claim as new and desire to secure by Letters Patent is:

1. A feeder comprising: means forming a frame, and means providing feed for animal consumption attached to means supported for rotation on said frame, said feed providing means comprising edible material attached to a flexible backing by means of an adhesive.

2. The combination of claim 1, said rotatable means comprising at least one roller having pivot means journalled in said frame.

3. The combination of claim 1, said edible material comprising seeds and said adhesive comprising an edible adhesive.

4. A bird feeder comprising: a frame; upper and lower spaced rollers journalled on said frame for rotation relative thereto; a tape; edible material affixed to said tape; and means removably attaching said tape to said rollers.

5. The combination of claim 4, including means for rotating one of said rollers.

6. The combination of claim 4, including braking means for preventing undesired rotation of at least one of said rollers.

7. The combination of claim 1, said flexible backing comprising an elongated tape member having at least one end attached to said means supported for rotation.

8. A feeder comprising: an elongated flexible tape-like member; a frame for supporting said member; edible means attached to said member; and means on said frame movably attaching said member relative to said frame and providing for adjustment of said member to different positions relative to said frame.

References Cited in the file of this patent

UNITED STATES PATENTS

| 281,993 | Goldstein | July 24, 1883 |
| 2,235,959 | Copeman | Mar. 25, 1941 |
| 2,306,312 | Hyde | Dec. 22, 1942 |

FOREIGN PATENTS

| 507,460 | France | June 23, 1920 |